(12) United States Patent
Arimilli et al.

(10) Patent No.: US 6,434,670 B1
(45) Date of Patent: Aug. 13, 2002

(54) METHOD AND APPARATUS FOR EFFICIENTLY MANAGING CACHES WITH NON-POWER-OF-TWO CONGRUENCE CLASSES

(75) Inventors: Ravi Kumar Arimilli, Austin; Leo James Clark, Georgetown; John Steven Dodson, Pflugerville; Guy Lynn Guthrie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,948

(22) Filed: Nov. 9, 1999

(51) Int. Cl.⁷ .............................................. G06F 12/00
(52) U.S. Cl. ..................... 711/128; 711/129; 711/133
(58) Field of Search ............................. 711/128, 133, 711/129, 144, 145

(56) References Cited

U.S. PATENT DOCUMENTS 5,522,056 A * 5/1996 Watanabe et al. ........... 395/455
5,584,002 A * 12/1996 Emma et al. ................ 395/403
5,897,951 A * 4/1999 Cheong et al. ................ 711/3
6,000,014 A * 12/1999 Arimilli et al. ............. 711/128

* cited by examiner

*Primary Examiner*—Do Hyun Yoo
*Assistant Examiner*—Kimberly N McLean
(74) *Attorney, Agent, or Firm*—Volel Emile; Bracewell & Patterson, L.L.P.

(57) ABSTRACT

A method and apparatus for efficiently managing caches with non-power-of-two congruence classes allows for increasing the number of congruence classes in a cache when not enough area is available to double the cache size. One or more congruence classes within the cache have their associative sets split so that a number of congruence classes are created with reduced associativity. The management method and apparatus allow access to the congruence classes without introducing any additional cycles of delay or complex logic.

18 Claims, 5 Drawing Sheets

METHOD AND APPARATUS FOR EFFICIENTLY MANAGING CACHES WITH NON-POWER-OF-TWO CONGRUENCE CLASSES

BACKGROUND OF THE INVENTION

1. Technical Field

The present invention generally relates to computer systems, and more specifically to a cache and method for accessing a cache in a computer system. In particular, the present invention allows caches with a number of congruence classes other than a power of two, and provides a way to split congruence classes to provide storage for values for which some class selectors would otherwise select a non-existent class.

2. Description of the Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure the integrity of data that may be operated on by multiple processes on multiple processors and potentially contained in multiple cache units. It is desirable to satisfy these objectives consistent with the further commercial objectives of increasing processing throughput, minimizing electronic device area and reducing complexity.

Both multiprocessor and uniprocessor systems usually use multi-level cache memories where typically each higher level is smaller and has a shorter access time. The cache accessed by the processor, and typically contained within the processor component of present systems, is typically the smallest cache.

Both data and instructions are cached, and data and instruction cache entries are typically loaded before they are needed by operation of prefetch units and branch prediction units. Called "streams", groups of instructions associated with predicted execution paths can be detected and loaded into cache memory before their actual execution. Likewise data patterns can be predicted by stride detection circuitry and loaded before operations requiring the data are executed.

Cache memories are typically organized in a matrix arrangement. One direction in the matrix corresponds to congruence classes and the other, equivalent sets within each congruence class. The congruence class partitioning divides the use of the cache with respect to information type, typically a portion of the address field of a memory location is used to partition the distribution of values from memory across the congruence class sets. In this way, it is only necessary to examine the entries within the directory for a given class in order to determine memory conflicts or whether a particular value at a given address is present or absent from the cache.

Due to the level of complexity of modern processors, there is often a need to adjust the device area during the design process. When area constraints are encountered, removal of a portion of the cache memory can free large device areas, since the data storage and logic associated with a cache can be quite large as compared to other functional blocks within the processor. Also, extra area can be available when a design is complete that is insufficient to double the size of a cache, but is substantial enough to provide, for example, a 50 percent increase in the size of a cache.

Reducing the associativity of a cache can directly scale the size of the cache, but it has a direct impact on performance, as all of the sets will be reduced in depth. Reducing associativity also can complicate the directory logic and storage for example, reduction of an 8-way cache to a 7-way cache creates an invalid value in a 3-bit set selector, and use of that value must be avoided by the logic, or a fault may occur.

Reducing or increasing the number of congruence classes presents a more complex problem. The congruence must cover all of the information classes in the class set. For example if a cache has 8 congruence classes associated with three bits out of an address field, a set cannot be simply removed. The number of congruence classes could be reduced to 4 with each of the congruence classes covering two of the information classes covered by each class in the 8 congruence class design, but that would have a large impact on cache performance. Likewise, adding congruence classes to a cache design (other than increasing the number to the next exponential power of two) is similar to reducing the quantity from the next power of two. Selector values for the congruence classes that were not added would have no storage or directory entries associated with them.

In light of the foregoing, it would be desirable to implement a cache method and a cache architecture in which the number of congruence classes in a cache may be reduced or increased in increments other than a power of two without causing a large reduction in cache access latency.

SUMMARY OF THE INVENTION

It is therefore one object of the present invention to provide an improved cache memory for a computer system.

It is another object of the present invention to provide a cache memory for a computer system, wherein the number of congruence classes in said cache can be adjusted to sizes other than powers of two.

It yet another object of the present invention to provide a cache memory for a computer system that has a non-power of two congruence class count and introduces no delay while incorporating logic to enable a non-power-of-two size.

The foregoing objects are achieved in a cache and method for accessing a cache, wherein the cache receives an access request containing a congruence class selector, the cache determines that the congruence class is a class providing storage for values associated with at least one other congruence class selector and the cache selects a subset from a plurality of sets associated with said congruence class in conformance with said congruence class selector. The cache may further select the subset by ignoring a remainder of sets by comparing a decode of the congruence class selector with a fixed value as part of the directory tag entry comparison, causing the tag comparisons for the remainder to be masked. The cache may further incorporate a least-recently-used (LRU) tree that has behavior selected by the determination that the congruence class is a class providing storage for values associated with at least one other congruence class selector.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
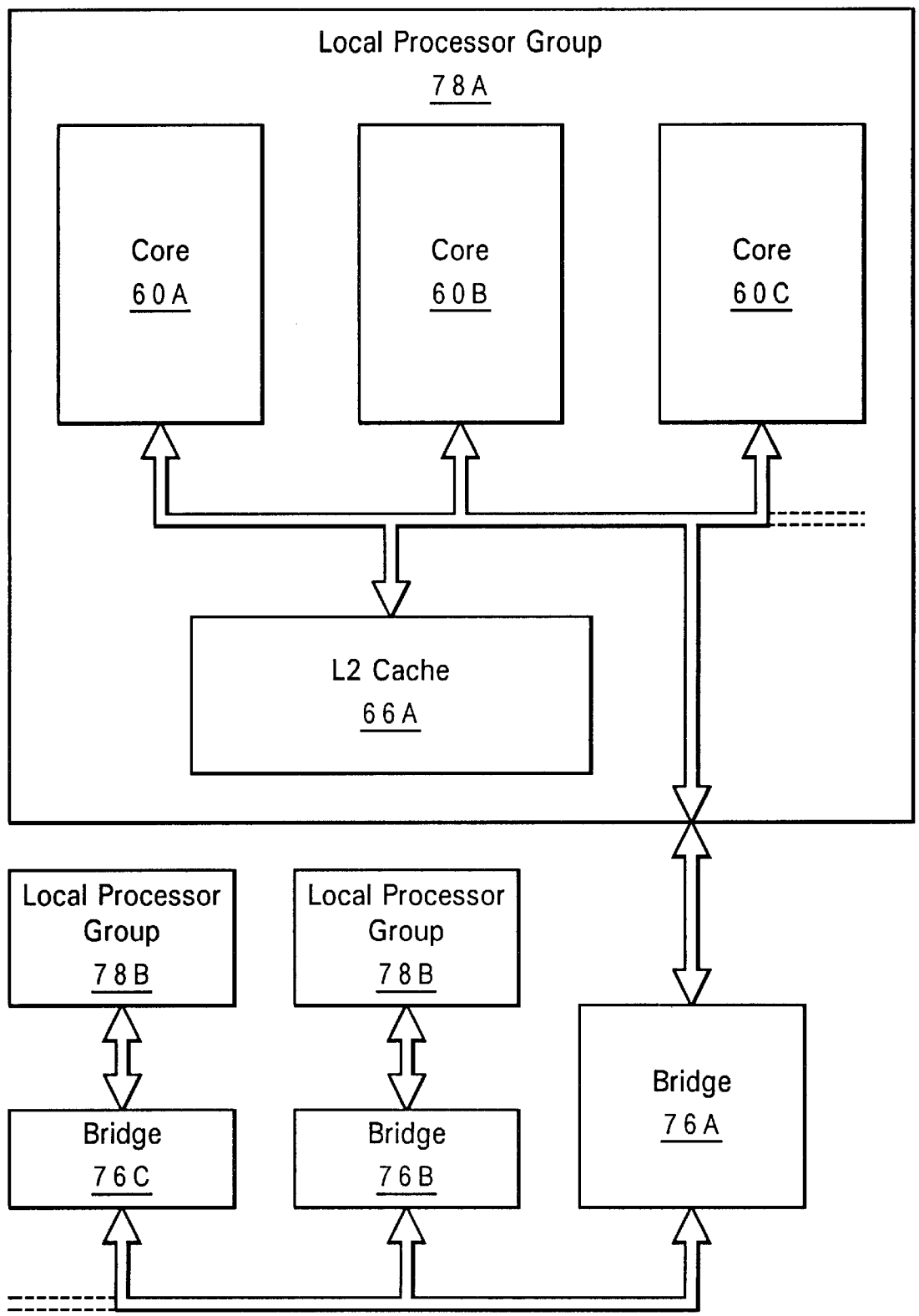
FIG. 1 is an electrical block diagram of a multiprocessor computing system in which the present invention may be practiced, depicting core execution units, system memory, buses and bus bridges.

With reference now to the figures, and in particular with reference to FIG. 1, a multiprocessor computing system is shown in which the present invention can be practiced. The computing system is a connection of local processor groups 78 that perform program operations. This arrangement is particularly useful for scalar mathematical operations such as array multiplication and inversion. Local processor groups comprise cores 60 that may contain caches or other local storage and the processor groups share a level of cache 66A, that can be accessed by all of the processors in a group, and optionally by other local processing groups through bridges 76.

Figure 2:
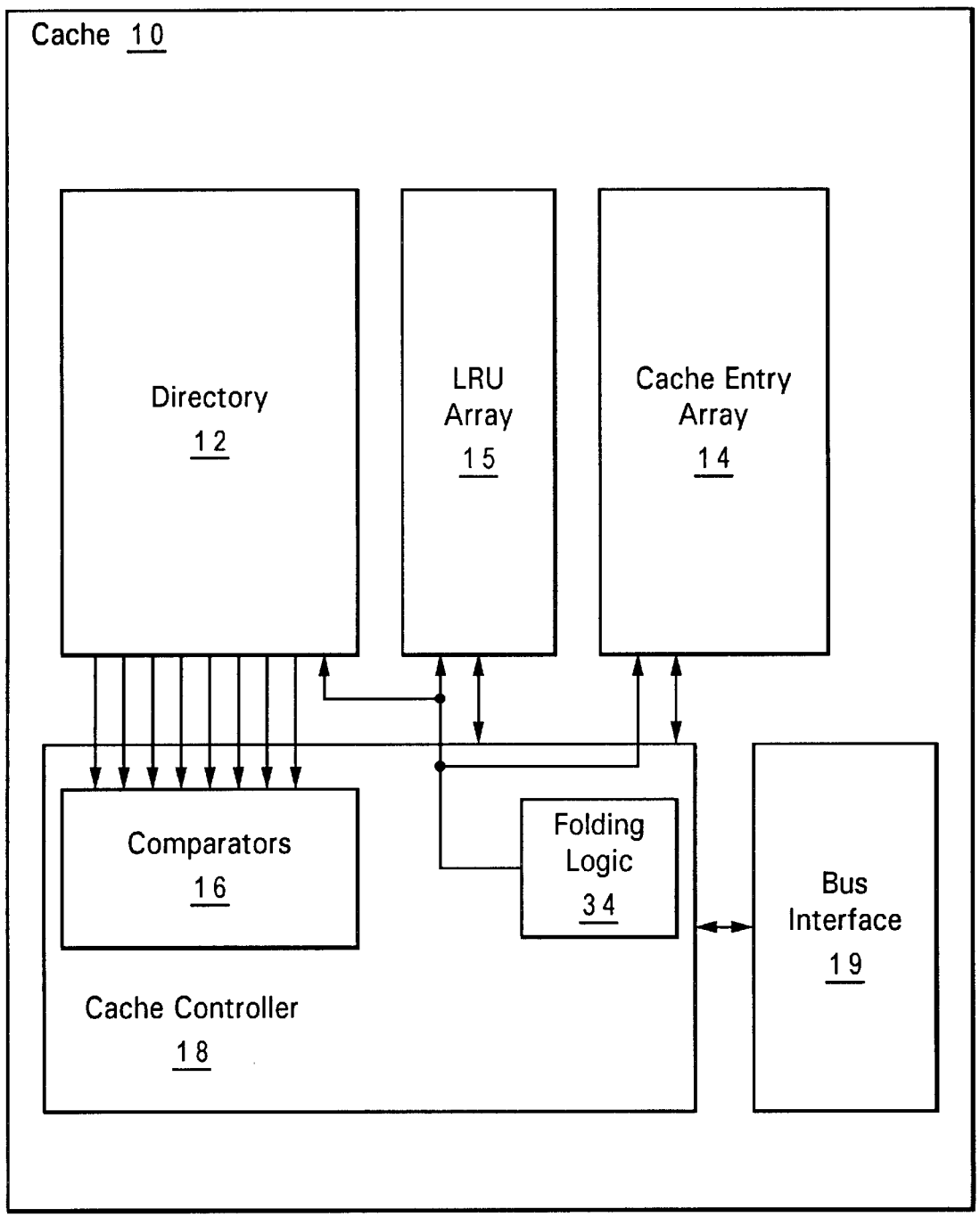
FIG. 2 is a electrical block diagram depicting elements within a cache memory in accordance with an illustrative embodiment of the invention.

Referring now to FIG. 2, an embodiment of a cache 10 in accordance with the present invention is shown. Cache entry array 14 stores operand data and/or instructions for use by cores 60. Access to the values stored in cache entry array 14 is controlled by cache controller 18. Cache entry array 14 contains congruence classes that store values classified by a portion of the address of the values. Values are located by selecting a congruence class, based on a portion of the address supplied with the access request, and a particular set within a congruence class that contains the data is located by matching tags within directory 12. The tags are formed by another portion of the address separate from the bits forming the class selector and are stored in directory 12 when the value corresponding to the address is stored in cache entry array 14. The congruence classes store values that are "congruent" with a particular set of addresses. This allows classification of the values within cache entry array 14, reducing the search for a value location based on its address to the one class that can contain values with a particular class selector field within the value's address.

Comparators 16 compare tags for each of the set entries for a selected congruence class by matching the tag portion of the access address with the tags stored in directory 12. This completes the locating of the set containing the values, as the value location within the cache is specified by congruence class and then the set within the congruence class. Least-recently-used (LRU) array 15 stores information used to select a cache victim when the access request value is not present in cache 10. The value is then loaded into the victim location. Bus interface 19 provides the interface to a bus for connection to processors and other system units.

The present invention provides for caches with a non-power-of-two number of congruence classes. Since a portion of an address is used to select congruence classes, there must be storage for all addresses that might be used. The present invention accomplishes this by using a single congruence class storage to contain information for more than one congruence class selector in short, "folding" one class into another, allowing the storage that selector that would be required without "folding" to be removed. Folding logic 34 provides this function by altering the addressing provided to directory 12, LRU array 15 and Value storage 14.

Figure 3:
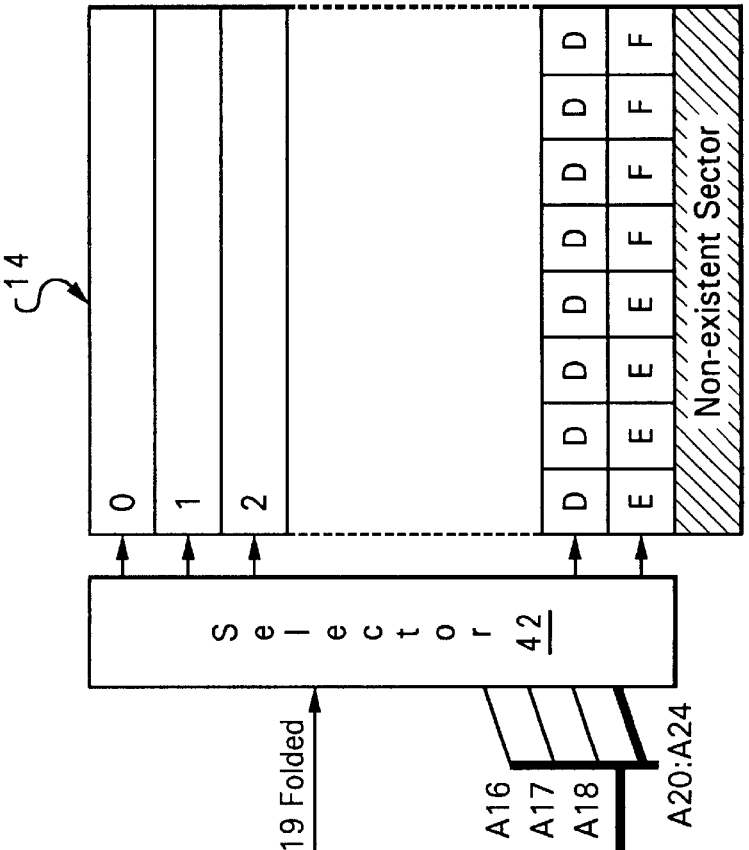
FIG. 3 is a high-level schematic diagram of selection logic in accordance with an illustrative embodiment of the invention.
Figure 3:
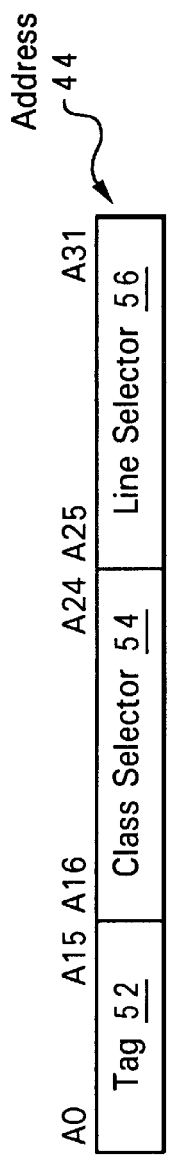
Figure 3:
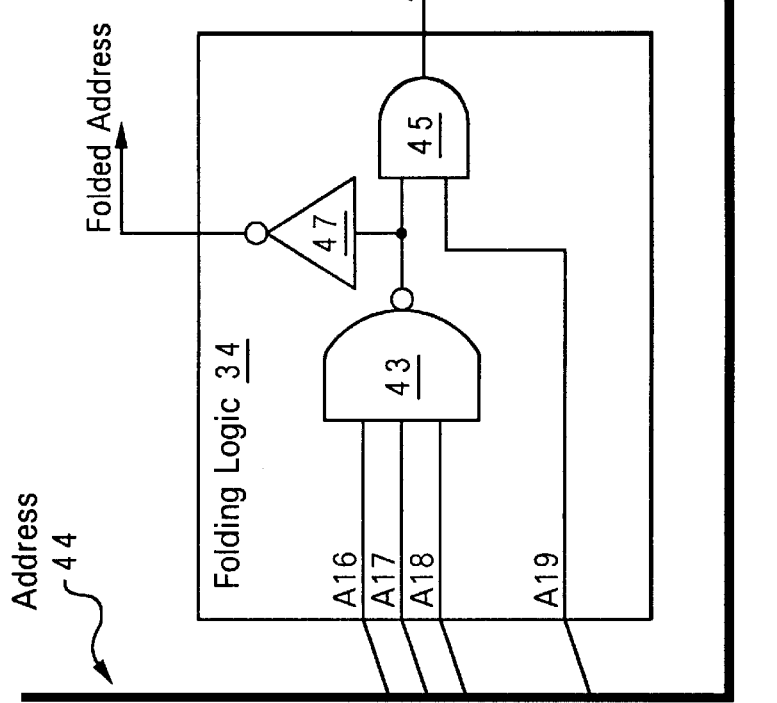

Referring now to FIG. 3, one embodiment of folding logic 34 is shown in detail. The use of address 44 to access cache 10 is as follows: the most significant bits A0:A15 correspond to tag 52. Tag values are stored in directory 12. The middle bits A16:A24 are used to select congruence classes within value storage 14, tag entries from directory 12 and LRU entries from LRU array 15. The least significant bits A25:A31 provide a line offset selector into the cache line from the set matched by tag entry comparison within the congruence class selected by class selector 54. Folding logic alters the congruence class selection process by folding address line A19. In the exemplary embodiment, there are 256 congruence classes divided into 16 sectors each containing 32,768 bytes. Sectors numbered 0-F (hexadecimal) are selected by the uppermost 4 bits of class selector 54 (A16:A19). Also in the example, storage for the last sector corresponding to "F" is not present in array 14. Folding logic maps the storage for a selector "F" to the sector that would ordinarily contain storage for only "E" and allows the storage that would ordinarily be required for "F" to be non-existent. This is accomplished by detecting the presence of an "E" or "F" selector value via NAND gate 43, as A16–A18 will all be high. When this is true, A19 is gated off by the action of AND gate 45, to produce an A19 folded signal. A19 folded is used as the least significant sector address in place of A19. Selector 42 uses A19 folded and A16:A18 to select congruence classes within data array 40. This maps accesses for "E" values and "F" values to the same sector. Inverter 47 provides a signal that indicates a folded address for use by cache controller 18 and LRU array 15.

Figure 4:
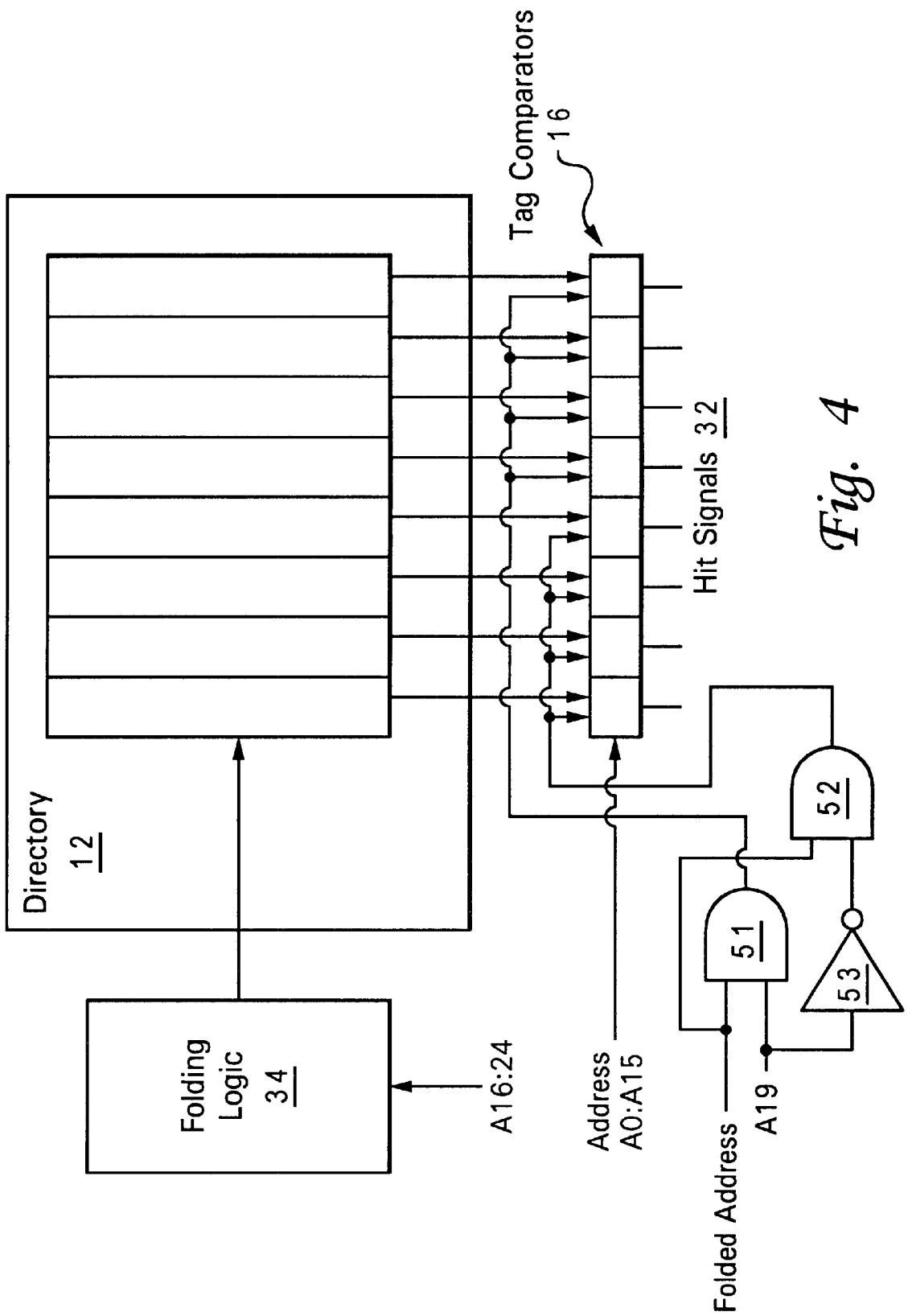
FIG. 4 is a high-level schematic diagram of directory comparison logic in accordance with an illustrative embodiment of the invention.

Referring now to FIG. 4, folding logic 34 again provides the folded addresses to directory 12 so that the last directory entry is mapped to selectors "E" and "F". AND gates 51 and 52 provide an extra comparison signal to tag comparators 16. If the folded address signal is true, then either AND gate 51 or AND gate 52 will become active, depending on the state of A19. If A19 is low with a folded address true (corresponding to "E" selector), inverter 53 will produce a high output, activating AND gate 52, which in turn will provide a high input to each of the comparators connected to the first four set entries in directory 30. Hit signals 32 indicate a match is found, and this extra signal provided is compared with a statically wired logic high value, so the comparison is allowed to be valid if the rest of the bits (those provided by the tags) match from directory 30. The tags are matched with A0:A15 which are provided to each of tag comparators 16. The signal produced by AND gate 51 is low for the case of A19 low, so tag comparators 16 that are connected to the last four set entries are disabled by the comparison of this low value with the static logic high value. Thus the outputs of AND gate 51 and AND gate 52 act as a selector for the entire congruence class, since read accesses will not occur without a directory tag match for a location.

Figure 5:
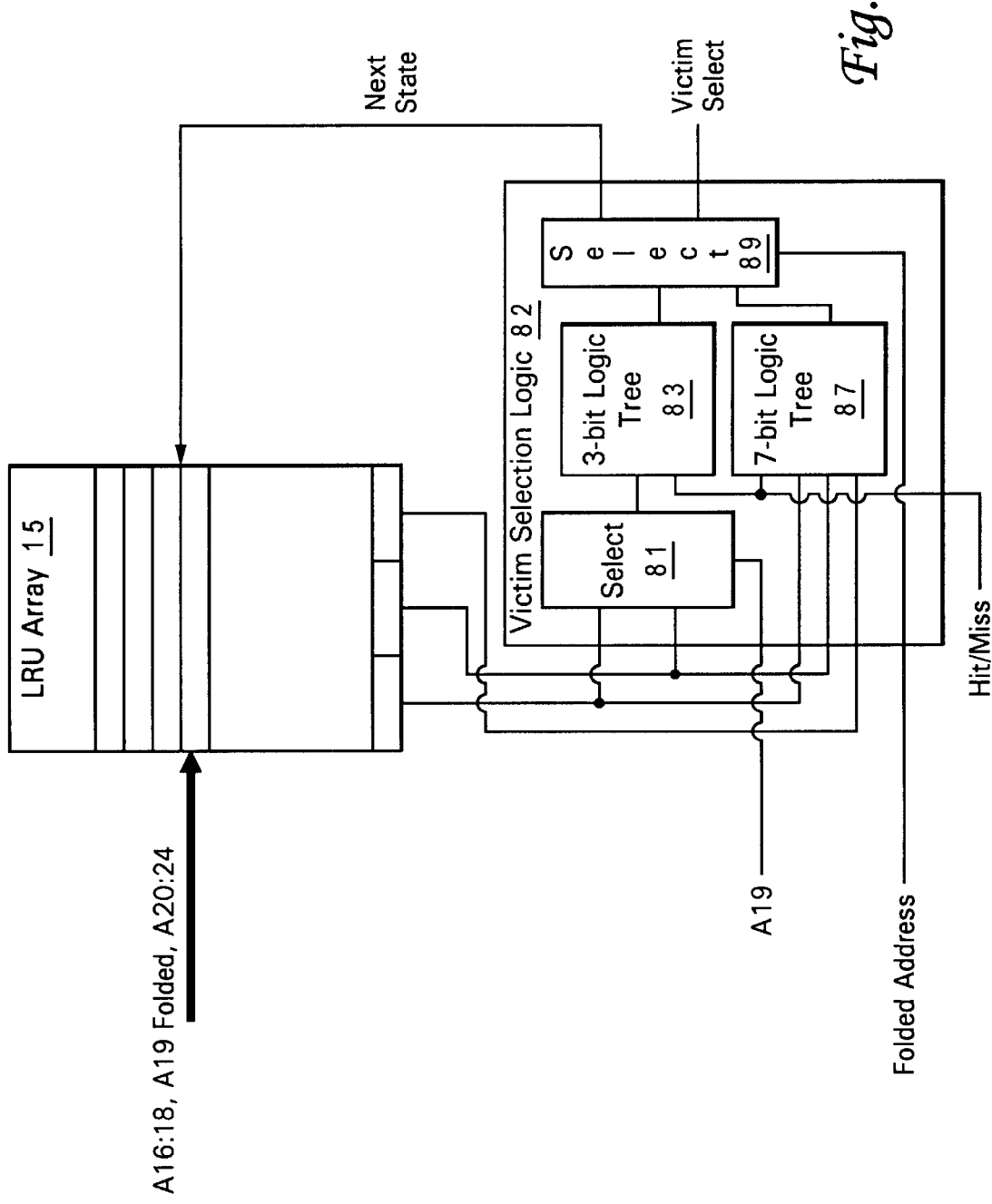
FIG. 5 is a high-level schematic diagram of least-recently-used logic in accordance with an illustrative embodiment of the invention.

Referring now to FIG. 5, the handling of write accesses to cache 10 is detailed. Write accesses occur on cache misses where a matching value is not present for an address. The write occurs to a victim, which is selected by victim selection logic 82. In the prior art, a seven-bit tree is used by an 8-way associative cache. The victim is selected by logic that determines the least-recently-used entry in value storage 14, from information stored in LRU array 15. The selection address provided to LRU array 15, is again the folded address comprising A16:A18, folded A19 and A20:24. This selects the same LRU array 15 entry for selector "E" and selector "F". Victim selection logic 82 provides a mechanism to change the LRU behavior from one appropriate for a single 8-way associative set to one appropriate for two 4-way associative sets. In other words, the victim selection is changed from one of 8 to one of 4. The hit/miss activates the victim selection logic 82 when a cache miss occurs. A signal indicating a hit is generated by a logical OR of Hit Signals 32.

Select 81 selects the upper 3 bits or the next lower 3 bits from the LRU array, based upon A19. The upper 3 bits are selected for selector "F" or the next lower 3 bits are selected for selector "E". This output is provided to 3-bit logic tree 83, which then determines a next state and victim selection for the 3-bit tree. 7-bit logic tree 87, provides victim selection for the 8-way associativity behavior of all other sectors. Select 89 selects 3-bit logic tree 83 output only if the address is folded. This logic allows a single LRU entry for a congruence class to serve as a dual entry, effectively storing an LRU value for each of the two congruence classes that have been folded into one congruence class storage.

Although the invention has been described in association with an illustrative embodiment comprising an 8-way associative cache with 16 sectors of congruence class sets, the essence of the invention is that it provides an efficient way to implement a cache with non-power-of-two congruence classes by modifying the comparators to mask off tag matches from a group of sets within a congruence class. This partitions the cache with respect to read accesses. Another feature of the invention is dividing the LRU array entries so that LRU information can be maintained for each of the folded classes. This partitions the cache for write accesses (loads) by preventing storage associated with the other folded class from being victimized by the load. These two techniques can be performed for other divisions of cache size and provide minimal delay associated with and simple logic for selecting sets within the folded class.

While the above techniques apply to computer systems with cache memories, and specifically, processors with integrated cache memories, they are adaptable and contemplated to be useful in conjunction with other memory structures and other storage devices within a computer system. For example, the method might be used in content-addressable memories, as well as the cache of the illustrative embodiment.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for accessing a cache memory having a plurality of congruence classes each having a plurality of sets for storing values, comprising the steps of:

receiving an access request with a congruence class selector associated with a given one of said congruence classes;

determining that said given congruence class is a class providing storage for values associated with at least one other congruence class selector; and responsive to said determining step, selecting a subset from a plurality of sets associated with said given congruence class in conformance with said congruence class selector, wherein said selecting step further comprises:

comparing a tag entry with an address field associated with said access request; and said selecting step further selects a set from said subset in conformance with a result of said comparison.

2. The method of claim 1, wherein said comparing step further ignores a remainder of said plurality of sets associated with said given congruence class.

3. The method of claim 1, wherein said selecting step further ignores a least significant congruence class selector bit state.

4. The method of claim 3, further comprising the step of decoding said congruence class selector, and said step of comparing further compares a result of said decoding step to a fixed value.

5. The method of claim 1, further comprising the step of updating a least-recently-used array in conformance with a result of said determining step.

6. The method of claim 5, wherein said updating step is performed by a first logic tree if said given congruence class is a class providing storage for data associated with said at least one other congruence class selector, and a second logic tree if said given congruence class is not a class providing storage for data associated with any other congruence class selector.

7. The method of claim 5, further comprising the step of selecting a victim from said given congruence class to provide storage for a result of said access request, and said selecting step further uses a field from said least-recently-used array corresponding to said subset.

8. The method of claim 2, further comprising partitioning at least one of said congruence classes into said remainder and said subset, wherein a size of said subset and said remainder are half of a size of said given congruence class.

9. A cache memory comprising:

data storage means comprising a plurality of congruence classes each having a plurality of sets for storing values; and cache controller means, coupled to said data storage means, for controlling access to values in said data storage means, wherein said cache controller means receives a congruence class selector for selecting a given one of said congruence classes when a value access is requested, and said cache controller means selects a subset of a plurality of sets associated with said given congruence class responsive to said congruence class selector, wherein said cache controller means further compares a tag entry with an address field associated with said access request; and further selects a set from said subset based on said comparison.

10. The cache of claim 9, wherein said cache controller means further selects said subset by forcing a directory match to ignore a remainder of said plurality of sets associated with said given congruence class.

11. A cache memory comprising:

data storage means comprising a plurality of congruence classes each having a plurality of sets for storing values; and cache controller means, coupled to said data storage means, for controlling access to values in said data storage means, wherein said cache controller means receives a congruence class selector for selecting a given one of said congruence classes when a value access is requested, and said cache controller means selects a subset of a plurality of sets associated with said given congruence class responsive to said congruence class selector, wherein said cache controller means further selects said subset by forcing a directory match to ignore a remainder of said plurality of sets associated with said given congruence class and wherein said cache controller further selects said subset by ignoring a least significant congruence class selector bit.

12. A cache memory comprising:

data storage means comprising a plurality of congruence classes each having a plurality of sets for storing values; and cache controller means, coupled to said data storage means, for controlling access to values in said data storage means, wherein said cache controller means receives a congruence class selector for selecting a given one of said congruence classes when a value access is requested, and said cache controller means selects a subset of a plurality of sets associated with said given congruence class responsive to said congruence class selector, wherein said cache controller means further selects said subset by forcing a directory match to ignore a remainder, of said plurality of sets associated with said given congruence class and, wherein said cache controller means forces said directory match to ignore said remainder of the plurality of sets associated with the given congruence class by comparing a signal decoded from said congruence class selector with a fixed logic value.

13. The cache of claim 9, wherein said cache controller updates a least-recently-used array in conformance with said congruence class selector.

14. The cache of claim 12, wherein said cache controller has a first strategy for updating a least-recently-used information array and a second strategy for updating a least-recently-used information array, and said cache controller selects one of said first strategy and said second strategy based on said congruence class selector.

15. The cache of claim 12, wherein said cache controller selects victims in said subset by using a field from said least-recently-used array corresponding to said subset.

16. The cache of claim 9, wherein a size of said subset is half of a size of said given congruence class.

17. The cache of claim 9, wherein said cache controller means further comprises:

a plurality of comparator means for comparing tag entries in a directory with a bit field from addresses associated with said value accesses; and logic means coupled to said comparator means for disabling at least one of said comparator means for tag entries not associated with said subset, said logic means receives at least one bit from said bit field and disables said at least one comparator means based on said at least one bit.

18. A cache memory comprising:

data storage means comprising a plurality of congruence classes each having a plurality of sets for storing values; and cache controller means, coupled to said data storage means, for controlling access to values in said data storage means, wherein said cache controller means receives a congruence class selector for selecting a given one of said congruence classes when a value access is requested, and said cache controller means selects a subset of said plurality of sets associated with said given congruence class responsive to said congruence class selector, said selection is performed by plurality of comparator means and logic means coupled to said comparator means, said logic means receives at least one bit from addresses associated with said value accesses and disables at least one of said comparator means based on said at least one bit, and said cache controller means further has a first strategy for updating a least-recently-used information array and a second strategy for updating a least-recently-used information array and said cache controller selects one of said first strategy and said second strategy based on said congruence class selector.

* * * * *